(12) United States Patent
Eldering

(10) Patent No.: US 8,077,021 B2
(45) Date of Patent: Dec. 13, 2011

(54) DYNAMIC TACTILE INTERFACE

(75) Inventor: Charles A. Eldering, Furlong, PA (US)

(73) Assignee: Empire Technology Development LLC, Wilmington, DE (US)

( * ) Notice: Subject to any disclaimer, the term of this patent is extended or adjusted under 35 U.S.C. 154(b) by 333 days.

(21) Appl. No.: 12/396,777

(22) Filed: Mar. 3, 2009

(65) Prior Publication Data
US 2010/0225456 A1 Sep. 9, 2010

(51) Int. Cl.
H04B 3/36 (2006.01)
(52) U.S. Cl. ............. 340/407.2; 340/539.11; 340/384.7; 340/7.6; 345/173
(58) Field of Classification Search ............... 340/407.2, 340/407.1, 539.11, 7.6, 7.61, 384.7; 345/173
See application file for complete search history.

(56) References Cited

U.S. PATENT DOCUMENTS 7,103,407 B2 * 9/2006 Hjelt et al. .................... 600/547
7,148,875 B2 12/2006 Rosenberg et al.
7,375,454 B2 5/2008 Takasaki
2007/0016425 A1 * 1/2007 Ward ............................ 704/271
2008/0122797 A1 * 5/2008 Soh et al. ...................... 345/173
2009/0115734 A1 * 5/2009 Fredriksson et al. ......... 345/173

FOREIGN PATENT DOCUMENTS
JP 11-203025 7/1999

* cited by examiner

Primary Examiner — Hung T. Nguyen
(74) Attorney, Agent, or Firm — Carlineo, Spicer & Kee, LLC

(57) ABSTRACT

A method and system for exciting a dynamic tactile interface having a plurality of electrodes includes identifying an area within an image that is capable of tactile feedback and identifying a first subset of the plurality of electrodes in the dynamic tactile interface that correspond to the plurality of areas. A voltage is applied to each of the electrodes of to the plurality of electrodes to create a desired state for each electrode corresponding to the areas capable of tactile feedback. The dynamic tactile interface can be implemented as part of a viewable display type of device, or as a device without any viewable display.

23 Claims, 6 Drawing Sheets

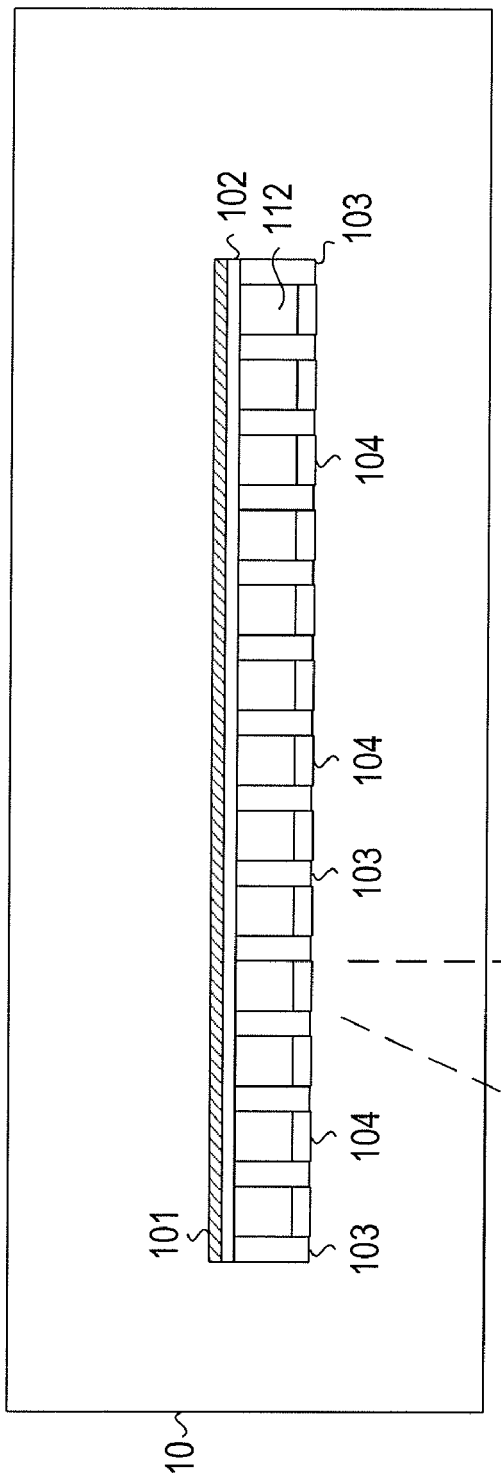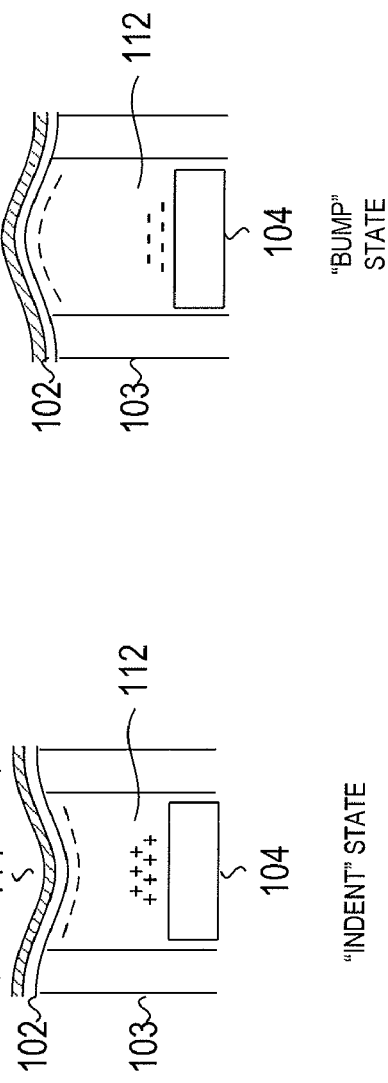

DYNAMIC TACTILE INTERFACE

CROSS REFERENCE TO RELATED APPLICATION

This application is related to U.S. patent application Ser. No. 12/396,787, filed Mar. 3, 2009, and entitled Elastomeric Wave Tactile Interface.

BACKGROUND

The disclosure relates to tactile interfaces, and more specifically to dynamic tactile interfaces.

Tactile devices with displays and interfaces are becoming increasingly important as computing, communications, and gaming platforms proliferate and as their capabilities increase. Developers are continually looking for additional ways to convey information, and for novel and differentiating human interfaces.

BRIEF DESCRIPTION OF THE DRAWINGS

The following detailed description will be better understood when read in conjunction with the appended claims, taken in conjunction with the accompanying drawings, in which there is shown one or more of the multiple embodiments of the present disclosure. It should be understood, however, that the various embodiments of the present disclosure are not limited to the precise arrangements and instrumentalities shown in the drawings.

In the Drawings:

FIG. 1A is a side view illustrating a dynamic tactile device with a touch screen interface;

FIG. 1B is a side view illustrating an "indent" state of a cell according to the dynamic tactile device of FIG. 1A;

FIG. 1C is a side view illustrating a "bump" state of a cell according to the dynamic tactile device of FIG. 1A;

DETAILED DESCRIPTION

Figure 2A:
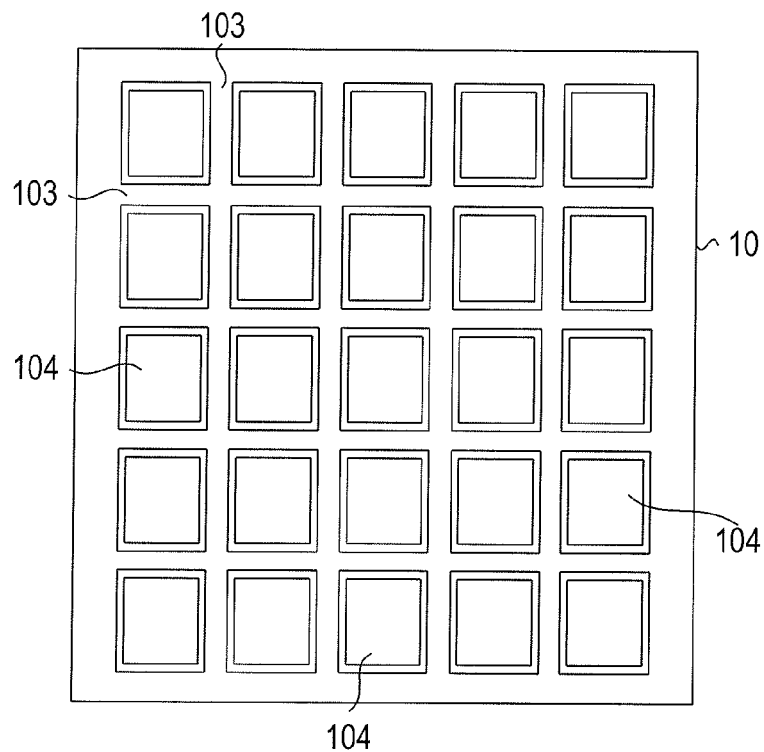
FIG. 2A is a top-down view illustrating the dynamic tactile device of FIG. 1A.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Briefly stated, the multiple embodiments of the present disclosure include a method of exciting a dynamic tactile interface having a plurality of electrodes including identifying an area within an image that is capable of tactile feedback and identifying a first subset of the plurality of electrodes in the tactile device that correspond to the areas. A voltage is applied to the first subset plurality of electrodes to create a desired state for each electrode corresponding to the areas capable of tactile feedback.

A dynamic tactile interface includes an electrostatic film, a plurality of electrodes, a plurality of support members located in between and perpendicular to the electrostatic film and the plurality of electrodes, and a plurality of charge circuits coupled to the plurality of electrodes. A controller is configured to determine areas within an image that are configured for tactile feedback, determine a subset of the electrodes that correspond to the areas, and send an excitation signal to excite the first subset of electrodes. The dynamic tactile interface can be implemented as part of a viewable display type of device, or as a device without any viewable display.

Figure 4A:
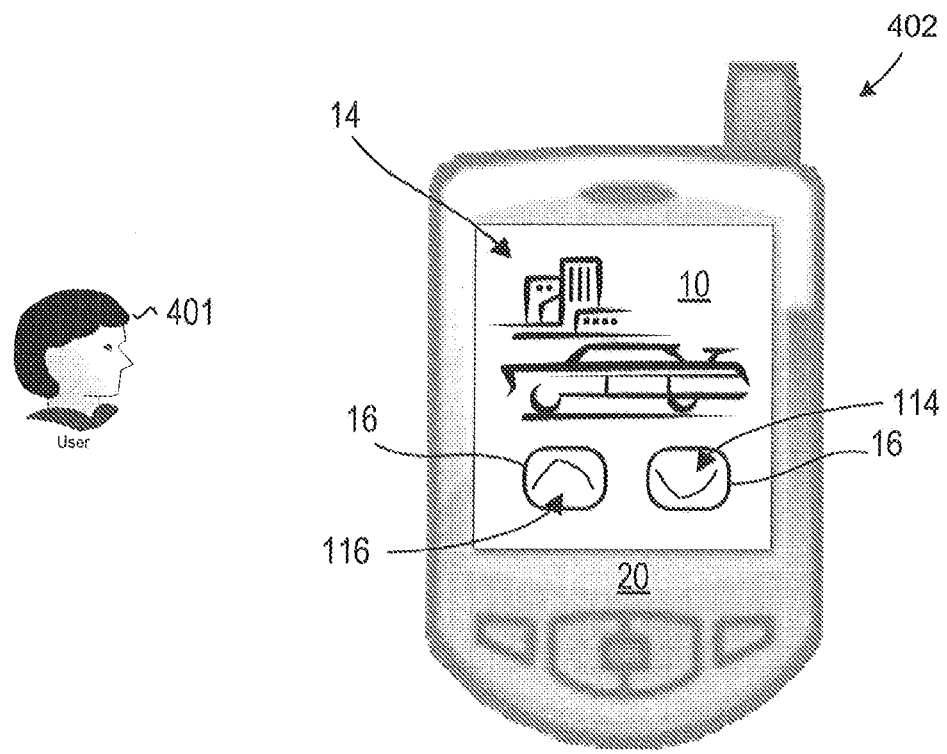
FIG. 4A is a block diagram illustrating an electronic device including embodiments of the dynamic tactile device of the present disclosure.

A dynamic tactile interface for use in devices with touch screens is disclosed. FIG. 4A is a block diagram illustrating an electronic device 402 including the dynamic tactile interface 10 of the present disclosure. The dynamic tactile interface 10 allows all or portions of an image to be presented to a user 401 through their sense of touch. The dynamic tactile interface 10 may enhance the user experience by placing a "bump" 116 or "indent" 114 in specific areas of the device where tactile feedback is beneficial. The dynamic tactile interface can be implemented as part of a viewable display type of device, or as a device without any viewable display. In some embodiments, a tactile image or portion of a tactile image corresponding to a visual image 14 is presented through the dynamic tactile interface 10. For example, in order to improve the accuracy of finger-based text entry, tactile feedback is provided to the user 401 in certain areas of the dynamic tactile interface 10 that correspond to areas of a displayed visual image 14 that require tactile feedback. In some embodiments, the dynamic tactile interface 10 presents information that is not intended for visual display, such as Braille or other information that is only to be presented by a tactile interface.

In the case of an image that can be presented for visual display, a portion of the image, such as a scene, background, component of the image (e.g., floor, ground) may be presented through the tactile interface. In some embodiments the user 401 views an image while information corresponding to the image (e.g., surfaces or particular information in the image) is presented through the tactile display. A processor (not shown) in combination with the appropriate software can be utilized to determine what portions of the visual image are to be interpreted or selected for display through the tactile display.

In some embodiments, the displayed visual image 14 is, for example, a graphical user interface between a user 401 and the electronic device 402. That is, as illustrated in FIG. 4A, the dynamic tactile interface 10 forms at least part of the user interface (UI) 20 between the user 401 and the electronic device 402. During operation of the electronic device 402, the displayed visual image 14 may change, in response to detecting a user interaction with the dynamic tactile interface, thus creating different areas of the device 10 that provide opportunity for tactile feedback. For example, the visual image 14 on the device 10 may be a web page that includes buttons, links or other indicia 16 for selection or "clicking" by a user. The areas of these indicia 16 on the visual image 14 are the areas of tactile feedback on the dynamic tactile interface 10 for which increased accuracy or ease of use may be desired.

The dynamic tactile interface 10 may be implemented in, on, or in conjunction with any electronic device 402 generally known in the art having or utilizing a touch screen interface (e.g., computer, laptop, video game screen or console, personal digital assistant, mobile phone, mobile media player, other touch-screen interfaces, etc.). In some embodiments, the dynamic tactile interface 10 is implemented in or as part of the touch screen interface of a mobile phone. In some additional embodiments, the electrostatic tactile interface 10 is implemented in a tactile keyboard and provides tactile feedback in areas of a keyboard where the keys are normally located. In still some other embodiments, the dynamic tactile interface 10 is implemented in a non-viewable part of a device, such as in the touchpad of a laptop computer and provides tactile feedback, for example, in the areas of the touchpad that represent the left and right mouse buttons. In one example, virtual buttons of an input device (e.g., a keypad, a keyboard, arrow keys, characters, numbers, symbols, etc.) might be presented by tactile feedback on the dynamic tactile interface 10. The texture of the virtual buttons (e.g., an outline of a key, a detent or registration dot for a key, Braille representations, etc.) for the input device might also be presented with tactile feedback within the virtual buttons on the dynamic tactile interface 10, such that multiple virtual buttons may be distinguished from one another.

FIG. 1A is a side view illustrating a dynamic tactile device with a touch screen interface. The dynamic tactile interface 10 may include partially conducting layer 101, an electrostatic film 102, a plurality of cells 112, a plurality of support members 103, and a plurality of electrodes 104. The individual support members 103 are each either a longitudinal member or a latitudinal member; the plurality of support members 103 are arranged to form a cell matrix, which may be comprised of an uniform integral body (e.g., as illustrated in FIG. 2A) or as separate, disjointed longitudinal and latitudinal members (not shown). The plurality of support members 103 support the electrostatic film 102 and separate the electrostatic film 102 from the electrodes 104, with the electrostatic film 102 being placed on top of the plurality of support members 103 and the electrodes 104 on the bottom of the support members 103. Cells 112 are formed by the interior space bounded by the combination of the plurality of support members 103, the electrostatic film 102, and electrodes 104.

Figure 4B:
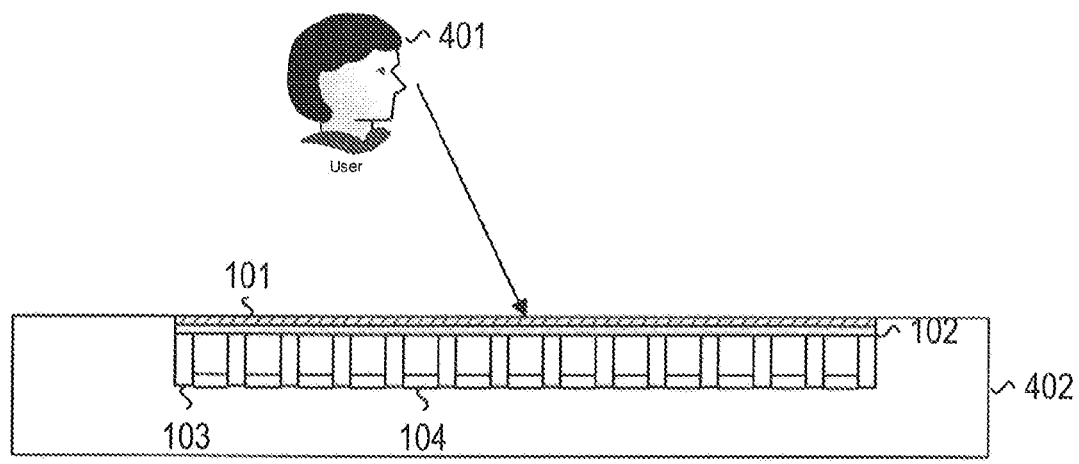
FIG. 4B is a side view illustrating a user-interface surface according to the dynamic tactile device of FIG. 1A.

FIG. 4B is a side view illustrating a user-interface surface according to the dynamic tactile interface of FIG. 1A with the electrostatic film 102 and the partially conductive layer 101 acting as the user-interface surface between the user 401 and the touch screen device 402.

The support members 103 are arranged generally perpendicular to both the electrostatic film 102 and the electrodes 104. The support members 103 are arranged in a cell matrix layout with an electrode 104 located at the bottom of the cell 112. For example, if the support members 103 are arranged so that there is a 5×10 matrix, then the electrodes 104 are arranged in a 5×10 matrix with each individual electrode 104 corresponding to a single cell 112 in the cell matrix. The support members 103 may be made of any number of materials generally known in the art having dielectric constants that minimize tunneling between adjacent electrodes, including positive or negative photoresist (e.g., epoxy-based polymer, phenol formaldehyde resin). The support members 103 may be rectangular, hexagonal, circular, or of another shape, and provide the structure against which the electrostatic film 102 is attracted to, or repelled from, the bottom electrodes 104. In some embodiments, the support members 103 are formed in a manner such that they can "breathe," allowing air to enter and exit the cell 112. In some embodiments, the support members 103 are sealed with a negative or positive pressure, thus creating a steady indent state or bump state (described in greater detail below).

The electrostatic film 102 is formed from any number of materials generally known in the art having appropriate properties for the dynamic tactile interface, including materials of the triboelectric series (e.g., silicone rubber, PTFE, PCTFE, PVC, polypropylene, and polyethylene). Other materials having sufficient elasticity such that they allow for the creation of indents and bumps may also be used. In some embodiments, the electrostatic film 102 has a generally constant negative charge. In some embodiments, a partially conductive layer 101 is placed on or above the electrostatic film 102 to keep the film 102 in a constant state of charge. In some embodiments, the partially conductive layer 101 is not needed because the electrostatic film 102 itself is partially conductive, but only to the extent that adequate charge can be maintained and does not leak across the cells 112.

FIGS. 1B and 1C are a side views illustrating an "indent" state 114 and "bump" state 116, respectively, of a cell 112 according to the dynamic tactile interface 10 of FIG. 1A. The electrodes 104 may be excited with a positive or negative charge. In the example illustrated in FIG. 1B, the electrode 104 has a positive charge. As described, the electrodes 104 are arranged in a cell matrix pattern. In FIG. 1B, the individual electrode 104 corresponds to an element, or cell 112, of the cell matrix. By applying a positive charge to the electrode 104, the portion of electrostatic film 102 and the partially conductive layer 101 immediately above the electrode 104 (i.e., the area above the cell 112 corresponding to the positively charged electrode 104) is attracted to the electrode because it is negatively charged, thus creating an "indent" state, or indentation 114. In FIG. 1C, the electrode has a negative charge. When a negative charge is applied to the electrode 104, the portion of the electrostatic film 102 and the partially conductive layer 101 immediately above the corresponding cell 112 of the excited electrode 104 will repel from the electrode, thus creating a "bump" state, or protrusion 116.

Figure 2B:
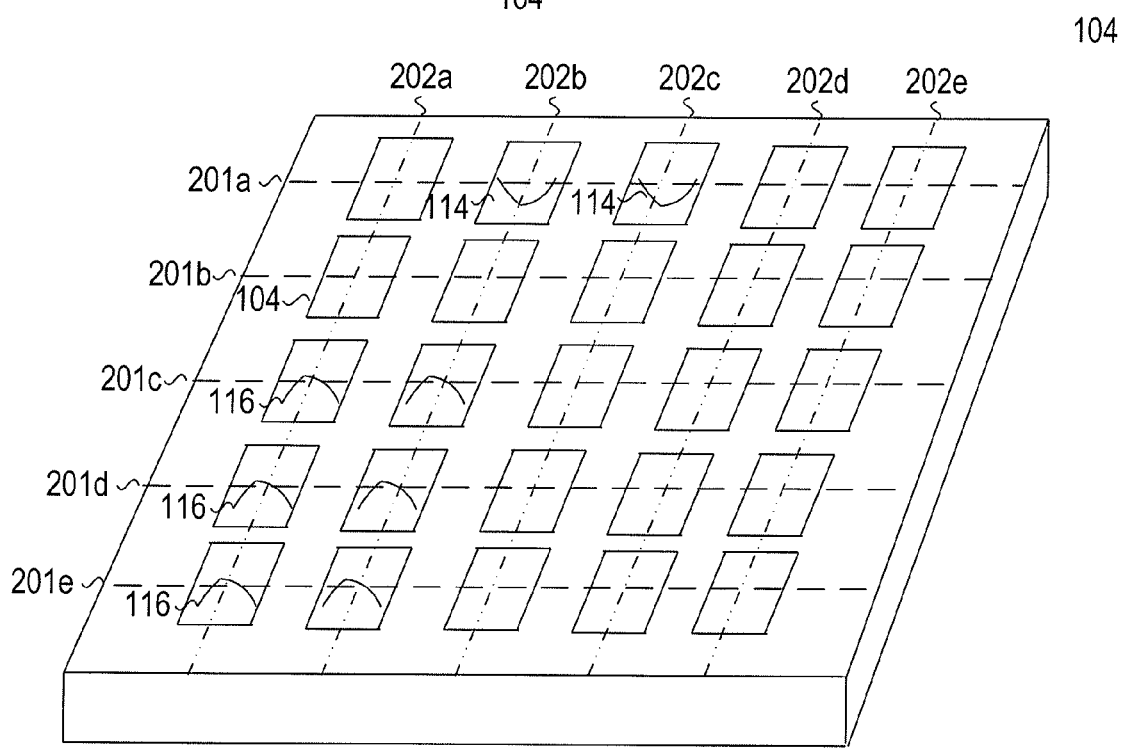
FIG. 2B is an elevated view illustrating excitation of individual electrodes according to the dynamic tactile device of FIG. 1A.
Figure 3A:
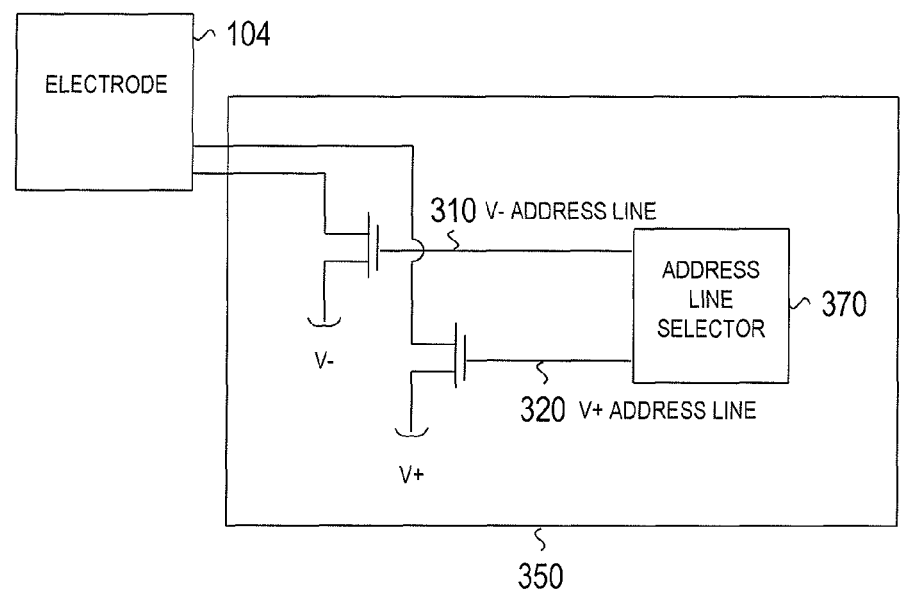
FIG. 3A is a circuit diagram illustrating a charge circuit according to the dynamic tactile device of FIG. 1A.

FIG. 3A is a circuit diagram illustrating a charge circuit 350 according to the dynamic tactile interface 10 of FIG. 1A. The charge circuit 350 may include an address line selector 370, a $V^-$ address line 310, and a $V^+$ address line 320. Addressing schemes similar to static RAM addressing schemes may be implemented to address the electrodes 104. The electrodes 104 of the dynamic tactile interface 10 discussed with reference to FIGS. 1A-2B are coupled to a $V^-$ address line 310 and a $V^+$ address line 320. The $V^-$ address line 310 and the $V^+$ address line 320 are located within the charge circuit 350. When the $V^-$ address line 310 is excited, the electrode 104 exhibits a negative charge. As discussed, in response to the negative charge, the area of electrostatic film 102 directly above the electrode 104 in cell 112 repels from the negatively excited electrode 104 and creates a protrusion 116. When the $V^+$ address line 320 is excited, the electrode 104 exhibits a positive charge. In response, the area of the electrostatic film 102 directly above the electrode 104 in cell 112 attracts to the positively excited electrode 104 and creates an indentation 114.

The individual electrodes 104 in the interface 10 are interconnected by a series of electrically conductive row and column couplers. The row and column couplers are in turn coupled to a power source (see FIG. 3A), thereby enabling the electrodes to be collectively or individually excited. More specifically, any individual electrode 104 may be selectively excited by addressing that electrode using the corresponding row and column couplers.

FIG. 2B is an elevated view illustrating excitation of individual electrodes according to the dynamic tactile interface of FIG. 1A. The row couplers 201a, 201b, 201c, 201d, 201e are each electrically coupled to a plurality of electrodes 104 that are in the same row (in this example across all five columns of the matrix). The column couplers 202a, 202b, 202c, 202d, 202e are each electrically coupled to a plurality of electrodes 104 that are in the same column (in this example, across all five rows). For example, to cause a protrusion 116 and effectuate a "bump" state in the electrode having a cell matrix site of (3,1), a positive charge is applied to both the row coupler 201c (i.e., row 3) and the column coupler 202a (i.e., column 1). In some embodiments, for a single electrode 104 to be excited, it receives an excitation from both its corresponding row and column couplers. Thus, the cells 112 (and the electrodes 104 therein) can be individually addressed, allowing the creation of any regular periodic pattern, a periodic pattern, random pattern, or tactile image on the device 10. In the example illustrated in FIG. 2B, the electrodes 104 having matrix sites of (3,1); (3,2); (4,1); (4,2); (5,1); and (5,2) have been excited with positive charges to create a protrusion 116 over the respective cells 112. Similarly, the electrodes 104 having matrix sites of (1,2) and (1,3) have been excited with negative charges to create an indent 114 over the respective cells 112.

Figure 3B:
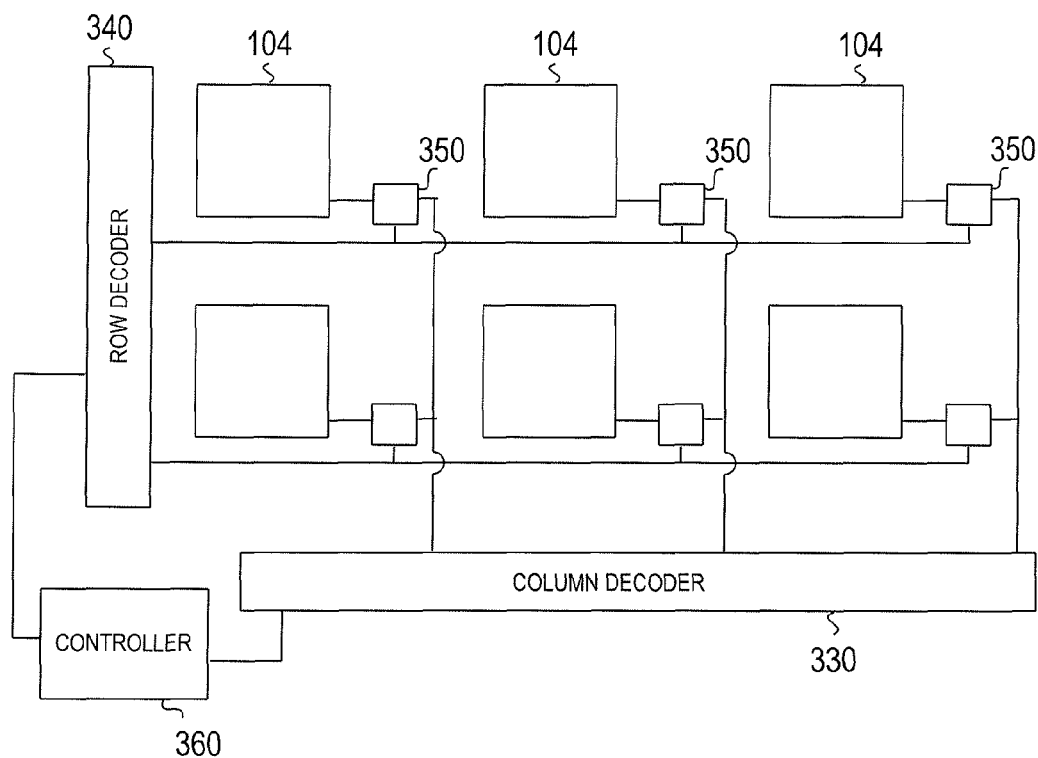
FIG. 3B is a block diagram illustrating an addressing scheme according to the dynamic tactile device of FIG. 1A.

FIG. 3B is a block diagram illustrating an addressing scheme according to the dynamic tactile interface 10 of FIG. 1A. Each individual electrode 104 is associated with a charge circuit 350 that controls the respective V$^-$ address line 310 and the V$^+$ address line 320 for that electrode 104. Each charge circuit 350 is coupled to a row decoder 340 and a column decoder 330. The row decoder 340 and column decoder 350 are controlled by a controller 360. In light of the present disclosure it is understood that the controller 360 is any microcontroller or electronic circuit generally known in the art capable of sending excitation signals to the row decoder 340 and column decoder 330, causing portions of the electrostatic device 10 to exhibit an indent 114 or protrusion 116 (see FIGS. 1B and 1C). In response to receiving user feedback, the controller 360 is capable of updating and adjusting the device in areas that require tactile feedback. The controller 360 excites the areas that require tactile feedback by sending excitation signals to the row decoder 340 and column decoder 330. Based on a desired tactile pattern on the device 10, the controller 360 determines when a particular row coupler 202 and column coupler 201 combination should be excited, and sends a corresponding excitation signal to the row decoder 340 and column decoder 350. Such an excitation signal causes the row decoder 340 to excite specific row coupler(s) 202 and the column decoder to excite specific column coupler(s) 201.

In some embodiments, the charge circuits 350 include AND logic gate to detect a decoder signal from the row decoder 340 and the column decoder 330. In this case, the charge circuit 350 will not excite the electrode 104 unless a decoder signal is received from both the row decoder 340 and column decoder 330. The charge circuit 350 also includes the Address Line Selector 370 circuit to evaluate the decoder signal(s) from row decoder 340 and column decoder 350. The Address Line Selector 370 evaluates these signals to determine whether to excite the V$^-$ address line 310 or the V$^+$ address line 320 to effect a positive or negative charge on the electrode, and thus an indentation 114 or protrusion 116. The charge circuit 350 is configured to excite the electrode 104 via V$^-$ address line 310 or the V$^+$ address line 320 if the appropriate decoder signal(s) arrive from both the row decoder 340 and the column decoder 330. The controller 360 is configured to send excitation signals to the row decoder 340 and column decoder 330, which in turn, sends the decoder signals to charge circuit 350. The charge circuit 350 determines whether to excite the V$^-$ address line 310 or the V$^+$ address line 320. As discussed, exciting the V$^-$ address line 310 creates an indentation 114 and exciting the V+address line 320 creates a protrusion 116.

Figure 5:
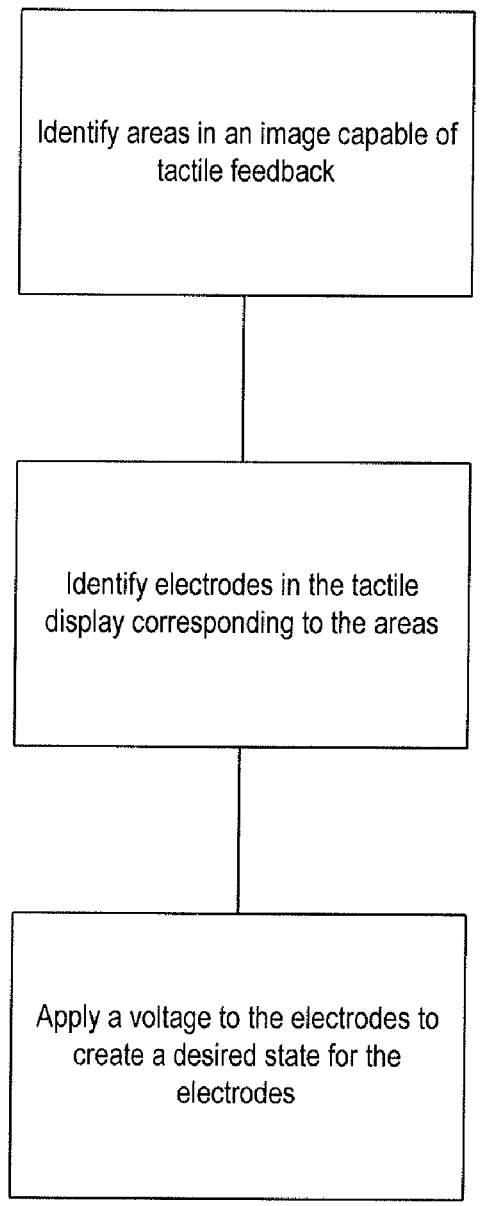
FIG. 5 is a flow diagram illustrating a method of exciting electrodes according to the dynamic tactile device of FIG. 1A.

FIG. 5 is a flow diagram illustrating a method of exciting electrodes according to the dynamic tactile interface 10 of FIG. 1A. As described above, areas of an image capable of tactile feedback are identified. As previously described, electrodes in the dynamic tactile interface 10 corresponding to the areas are identified. A voltage is applied to the electrodes to create the desired state for the electrodes in the dynamic tactile interface 10. The dynamic tactile interface 10 can be implemented as part of a viewable display type of device, or as a device without any viewable display.

Figure 6:
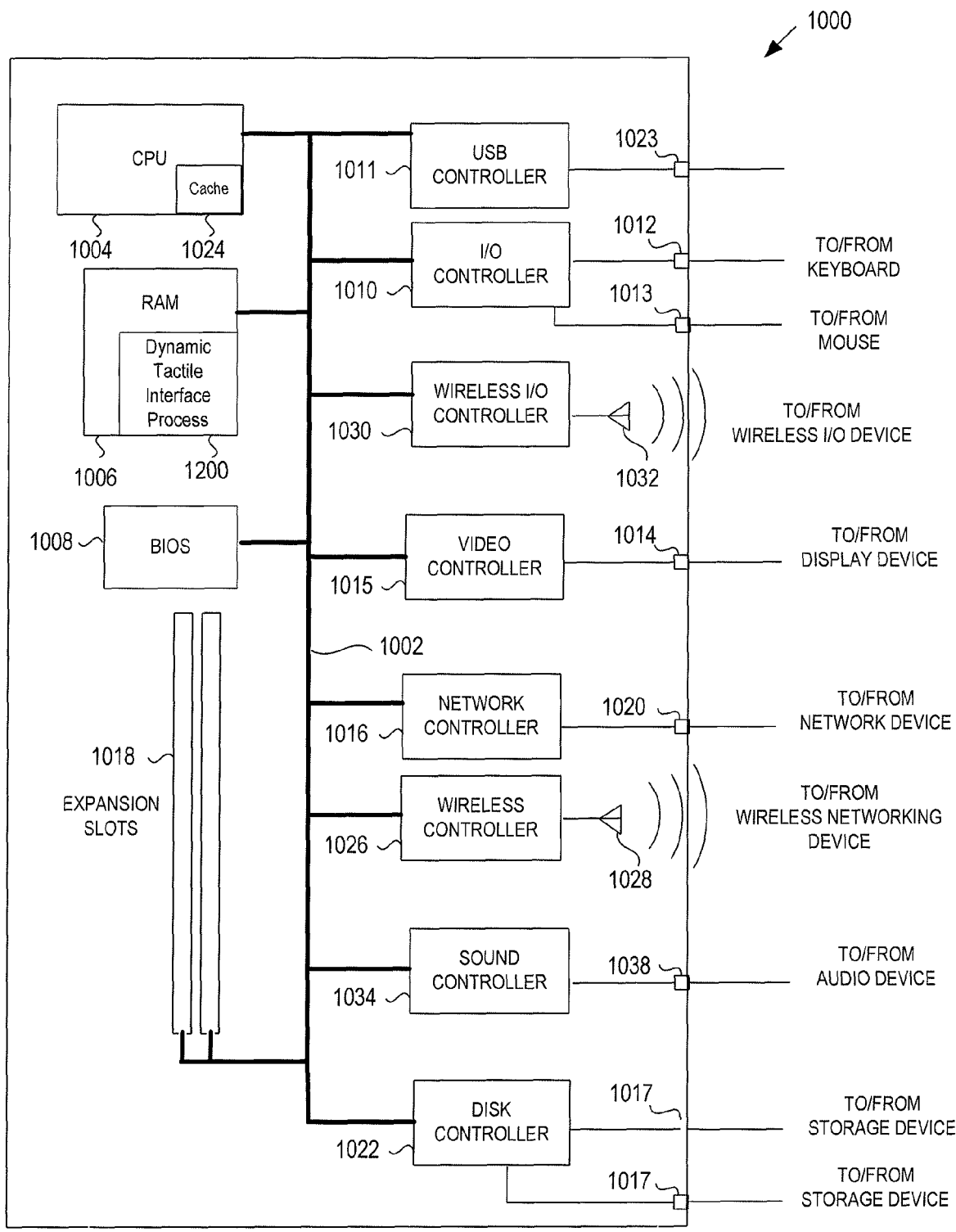
FIG. 6 is a block diagram illustrating a computer and/or architecture through which the multiple embodiments of the present disclosure may be implemented.

FIG. 6 is a block diagram illustrating a computer architecture or system 1000 that is arranged in accordance with the present disclosure. Example embodiments of dynamic tactile interfaces 10 include a controller 360, which may be realized and/or implemented as illustrated by FIG. 6. A system bus 1002 transports data amongst the Central Processing Unit (CPU) 1004, RAM 1006, the Basic Input Output System (BIOS) 1008 and other components. The CPU 1004 may include a cache memory component 1024. The RAM 1006 may include a dynamic tactile interface process 1200. The dynamic tactile interface process 1200 may determine the control information or excitation signal requirements for the row decoders 340 and the column decoders 330 to produce the desired tactile pattern described above with reference, for example, to the controller 360 and FIG. 3B. The computer system 1000 may include one or more external storage ports 1017 for accessing a hard disk drive, optical storage drive (e.g., CD-ROM, DVD-ROM, DVD-RW), flash memory, tape device, or other storage device (not shown). The relevant storage device(s) are coupled through the external storage port 1017 which is coupled to the system bus 1002 via a disk controller 1022. A keyboard and pointing device (e.g. mouse, touch pad) (not shown) can be coupled to the keyboard/mouse port(s) 1012, and other I/O devices could be coupled to additional I/O port(s) 1013, which are coupled to the system bus 1002 through the I/O controller 1010. Additional ports or devices, such as serial ports, parallel ports, firewire adapters, or biometric devices (not shown), may be utilized through the I/O controller 1010. A display device (not shown) can be coupled to a display device port 1014 which is coupled to the system bus 1002 through the video controller 1015. A network device (not shown), including but not limited to an Ethernet device or other device having networking capability, can be coupled to a network port 1020 which is coupled through the network controller 1016 to the system bus 1002. The computer system 1000 may be wirelessly coupled to a network device that is configured for wireless operation (not shown), including but not limited to wireless routers, using an antenna 1028 coupled to a wireless controller 1026 coupled to the system bus 1002, where the antenna transmits/receives signals to/from the network device. The computer system 1000 may include one or more USB ports 1023. A USB device (not shown), including but not limited to a printer, scanner, keyboard, mouse, digital camera, storage device, PDA, cellular phone, biometric device, webcam, and I/O adapters can be coupled to the USB port 1023 which is coupled to the system bus 1002 through the USB controller 1011. Other devices, such as cellular phones, PDAs, and other portable devices may also be coupled wirelessly via a wireless I/O antenna 1032 that is coupled to a wireless I/O controller 1030. Examples of wireless I/O technologies include, but are not limited to, Bluetooth, Infrared (IR), and Radio-Frequency (RF). Audio devices, such as microphones, speakers, or headphones may be coupled to a sound port 1038 that is coupled to a sound controller 1034 that is coupled to the system bus 1002. Expansion slots 1018 can include Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to couple network cards, video cards, sound cards, modems and any other peripheral devices generally used with a computer. The computer system 1000 also includes a source of power (not shown), including but not limited to a power supply coupled to an external source of power, and/or an internal or external battery. Detailed descriptions of these devices have been omitted for convenience only and should not be construed as limiting.

The embodiments of the present disclosure may be implemented with any combination of hardware and software. If implemented as a computer-implemented apparatus, the embodiment is implemented using means for performing all of the steps and functions described above.

The embodiments of the present disclosure can be included in an article of manufacture (e.g., one or more computer program products) having, for instance, computer useable media. The media has embodied therein, for instance, computer readable program code means for providing and facilitating the mechanisms of the embodiments of the present disclosure. The article of manufacture can be included as part of a computer system or sold separately.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or coupled with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of exciting a dynamic tactile interface having a plurality of electrodes, the method comprising:

identifying an area within an image that is capable of tactile feedback;
identifying, by a controller, a first subset of the plurality of electrodes in the dynamic tactile interface corresponding to the area; and
applying a voltage to each of the electrodes of the first subset of the plurality of electrodes to create a desired state for each electrode corresponding to the area capable of tactile feedback.

2. The method of claim 1, further comprising:
determining a row and a column for each electrode of the first subset of the plurality of electrodes; and
applying excitation signals to a row encoder and a column encoder corresponding to the row and the column for each of the first subset of the plurality of electrodes.

3. The method of claim 2, further comprising:
exciting an individual electrode selected from the first subset of the plurality of electrodes if a decoder signal is received at a charge circuit associated with individual the electrode in response the excitation signals received at the row encoder and column encoder from the controller.

4. The method of claim 2, wherein the voltage applied to the individual electrode is based on the decoder signal received from the row encoder and the column encoder.

5. The method of claim 4, wherein applying a positive voltage to the individual electrode creates the desired state of an indentation.

6. The method of claim 4, wherein applying a negative voltage to the individual electrode creates the desired state of a protrusion.

7. The method of claim 3, further comprising:
detecting an input in the area within the image capable of tactile feedback;
identifying a new area within the image that is capable of tactile feedback;
identifying a second subset of the plurality of electrodes corresponding to the new area; and
applying the voltage to each electrode of the second subset of the plurality of electrodes to create the desired state in the new areas capable of tactile feedback.

8. The method of claim 1, wherein the dynamic tactile interface includes an electrostatic film and the applied voltage results in the desired state being formed on the electrostatic film.

9. The method of claim 1, wherein the image is a visual image associated with the dynamic tactile interface.

10. The method of claim 1, wherein the image is a Braille symbol.

11. The method of claim 1, wherein the image represents an actuator in a keypad.

12. A dynamic tactile interface comprising:
an electrostatic film capable of having at least an indent state and a protrusion state;
a plurality of electrodes arranged in a matrix configuration and positioned below the electrostatic film;
a plurality of support members located in between and perpendicular to the electrostatic film and the plurality of electrodes;
a plurality of charge circuits coupled to the plurality of electrodes; and
a controller configured to determine areas within an image that are configured for tactile feedback, determine a first subset of the electrodes that correspond to the areas, and send excitation signals to excite the first subset of electrodes.

13. The dynamic tactile interface of claim 12, further comprising a row encoder coupled to the plurality of charge circuits and a column encoder coupled to the plurality of charge circuits, wherein the controller is configured to control the row encoder and the column encoder to address the plurality of electrodes.

14. The dynamic tactile interface of claim 13, wherein each of the plurality of charge circuits includes a corresponding individual charge circuit arranged to excite the corresponding one of the plurality of charge circuits when activated in response to a first decoder signal and a second decoder signal being asserted, wherein the individual charge circuit is configured to receive the first decoder signal from the row encoder and the second decoder signal from the column encoder.

15. The dynamic tactile interface of claim 14, wherein the individual charge circuit is arranged to excite a corresponding electrode from the plurality of electrodes by applying a voltage to the corresponding electrode in response to the first and second decoder signals received from the row encoder and the column encoder.

16. The dynamic tactile interface of claim 14, wherein the individual electrode of the plurality of electrodes is configured to cause an indentation in the electrostatic film in response to a positive voltage from the corresponding individual charge circuit from the plurality of charge circuits.

17. The dynamic tactile interface of claim 14, wherein the individual electrode of the plurality of electrodes is configured to cause a protrusion in the electrostatic film in response to a negative voltage from the corresponding individual charge circuit from the plurality of charge circuits.

18. The dynamic tactile interface of claim 14, wherein the controller is configured to identify new areas within the image that are configured for tactile feedback upon detecting an input in the area within the image capable of tactile feedback, determine a second subset of electrodes that correspond to the new areas, and send the excitation signals to the row encoder and the column encoder to excite the second subset of electrodes.

19. The dynamic tactile interface of claim 12, wherein the image is a visual image associated with the tactile display.

20. The dynamic tactile interface of claim 12, wherein the image includes non-visual areas of tactile feedback.

21. An apparatus for interfacing with a dynamic tactile interface, the tactile interface comprising an electrostatic film capable of having an indent state and a protrusion state, a plurality of electrodes positioned below the electrostatic film, a plurality of charge circuits coupled to the electrodes, and a plurality of support members located in between and perpendicular to the electrostatic film and the plurality of electrodes, the apparatus comprising:
    a controller coupled to the plurality of charge circuits, the controller configured to determine areas within an image on the dynamic tactile interface that are configured for tactile feedback, determine a subset of the electrodes that correspond to the areas, and send excitation signals to the charge circuits to excite the subset of electrodes.

22. The apparatus of claim 21, wherein the areas capable of tactile feedback include virtual buttons.

23. The apparatus of claim 22, wherein the areas capable of tactile feedback include tactile feedback to distinguish a first virtual button from a second virtual button.

* * * * *

UNITED STATES PATENT AND TRADEMARK OFFICE
CERTIFICATE OF CORRECTION

PATENT NO.           : 8,077,021 B2                        Page 1 of 1
APPLICATION NO.      : 12/396777
DATED                : December 13, 2011
INVENTOR(S)          : Eldering It is certified that error appears in the above-identified patent and that said Letters Patent is hereby corrected as shown below:

On the Cover Page, item (57), under "ABSTRACT", in Column 2, Line 6, delete "of to the" and insert -- of the --, therefor.

In Fig. 2B, Sheet 2 of 6, delete " 104 " and insert --  --, therefor.

In Fig. 3A, Sheet 3 of 6, delete "V-" and insert -- $V^-$ --, therefor at each occurrence throughout the Figure.

In Fig. 3A, Sheet 3 of 6, delete "V+" and insert -- $V^+$ --, therefor at each occurrence throughout the Figure.

In Column 6, Line 14, delete "V+address" and insert -- $V^+$ address --, therefor.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,077,021 B2  
APPLICATION NO. : 12/396777  
DATED : December 13, 2011  
INVENTOR(S) : Eldering It is certified that error appears in the above-identified patent and that said Letters Patent is hereby corrected as shown below:

On the Cover Page, item (57), under "ABSTRACT", in Column 2, Line 6, delete "of to the" and insert -- of the --, therefor.

In Fig. 2B, Sheet 2 of 6, delete " 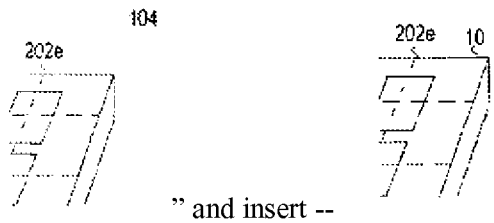 " and insert -- --, therefor.

In Fig. 3A, Sheet 3 of 6, delete "V-" and insert -- $V^-$ --, therefor at each occurrence throughout the Figure.

In Fig. 3A, Sheet 3 of 6, delete "V+" and insert -- $V^+$ --, therefor at each occurrence throughout the Figure.

In Column 6, Line 14, delete "V+address" and insert -- $V^+$ address --, therefor.

This certificate supersedes the Certificate of Correction issued May 1, 2012.

Signed and Sealed this  
Twenty-fifth Day of September, 2012

David J. Kappos  
*Director of the United States Patent and Trademark Office*